United States Patent Office
3,595,883
Patented July 27, 1971

3,595,883
PROCESS FOR THE PREPARATION OF 14β-HYDROXY - 17 - KETO - 15 - ANDROSTENES AND NOVEL INTERMEDIATES PRODUCED THEREBY
Adriano Afonso, East Orange, N.J., assignor to Schering Corporation, Bloomfield, N.J.
No Drawing. Filed June 16, 1969, Ser. No. 833,704
Int. Cl. C07c *169/20*
U.S. Cl. 260—397.45          17 Claims

ABSTRACT OF THE DISCLOSURE

14β - hydroperoxy - 15-androsten-17-ones, prepared by the action of oxygen on 14-androsten-17-ones, upon treatment with a mild reducing agent yields 14β-hydroxy-15-androsten-17-ones, useful intermediates in the synthesis of steroidal cardenolides.

Preferred species are 14β-hydroperoxy-5α-15-androsten-3β-ol-17-one 3-acetate and the 5β-epimer thereof (prepared by the action of oxygen on 5α-14-androsten-3β-ol-17-one 3-acetate and the 5β-epimer thereof, respectively) each of which, upon mild reduction, preferably with triethyl phosphite, yields 14β-hydroxy-5α-15-androsten-3β-ol-17-one 3-acetate and the 5β-epimer thereof, respectively, which are useful intermediates in the synthesis of uzarigenin and digitoxigenin, respectively.

FIELD OF INVENTION

This invention relates to novel chemical processes and to novel intermediates produced thereby.

More specifically, this invention relates to a process for the preparation of 14β - hydroxy-17-keto-15-androstenes (useful as intermediates in the synthesis of cardenolides) from 17-keto-14-androstenes, and to novel 14β-hydroperoxy - 17 - keto-15-androstene intermediates produced thereby.

PRIOR ART

Steroidal cardenolides, which occur in nature as glycosides, are of importance mainly because of their powerful action on the heart making them of use as heart stimulants, e.g. digitoxigenin, strophanthidin, and periplogenin. Some cardenolides have other pharmacological activities, e.g. uzarigenin which has been used for the treatment of diarrhea and bacillary dysentery. The cardenolides are characterized by the presence of a 14β-hydroxy and a 17β-butenolide function, thus the introduction of a 14β-hydroxy substituent into the steroidal nucleus is a prerequisite in the synthesis of a steroidal cardenolide.

The instant invention provides a novel and simple method of introducing a 14β-hydroxy substituent into a 17-keto-14-androstene to provide 14β-hydroxy-17-keto-15-androstenes which are useful intermediates in preparing steroidal cardenolides.

Prior to this invention, the conversion of a 17-keto-14-androstene, e.g. 5α-14-androsten-3β-ol-17-one 3-acetate, to a 14β-hydroxy-17-keto-15-androstene, e.g. 14β-hydroxy-5α-14-androsten-3β-ol-17-one 3-acetate, involved epoxidation across the double bond at C–14 and C–15 followed by treatment of the 14β,15β-oxido-androstane thereby formed, e.g. 14β,15β-oxido-5α-androstan-3β-ol-17-one 3-acetate, with alkali to obtain a 14β-hydroxy-17-keto-15-androstene, e.g. 14β-hydroxy-5α-15-androstene-3β-ol-17-one 3-acetate.

The process of the instant invention, which involves subjecting a 17-keto-14-androstene to the action of oxygen followed by mild reduction of the 14β-hydroperoxy-17-keto-15-androstene thereby formed, provides an alternative synthesis for the conversion of a 17-keto-14-androstene to a 14β-hydroxy-17-keto-15-androstene in which, advantageously, the yields in each step are superior to those in the prior art process. Additionally, my process is exceedingly economical and simple to carry out, thus making the instant process a method of choice when converting a 17-keto-14-androstene to a 14β-hydroxy-17-keto-15-androstene.

SUMMARY OF INVENTION

The invention sought to be patented in its composition-of-matter aspect resides in the concept of a chemical compound having a molecular structure in which a 14β-hydroperoxy group is attached to a 15-androsten-3-ol-17-one nucleus or the 3-lower alkanoate thereof, said compounds being valuable as intermediates in preparing the corresponding 14β-hydroxy-15-androstenes which, in turn, are valuable as intermediates in the synthesis of cardiac aglycones, known steroids of the cardenolide series, valuable mainly as cardiac stimulants.

A preferred species of the composition aspect of this invention is 14β-hydroperoxy-15-androsten-3β-ol-17-one 3-lower alkanoate, i.e. 14β-hydroperoxy-5α-15-androsten-3β-ol-17-one 3-lower alkanoate and 14β-hydroperoxy-5β-15-androsten-3β-ol-17-one 3-lower alkanoate both of which upon mild reduction produce the corresponding 14β-hydroxy compounds (i.e. the 5α- and the 5β-androstane derivatives) which, in turn, are convertible to known cardenolides, i.e. to uzarigenin, useful in treatment of diarrhea, and to digitoxigenin, a heart stimulant, respectively.

The invention sought to be patented in its process aspect resides in the concept of preparing a 14β-hydroperoxy-17-keto-15-androstene by subjecting a 17-keto-14-androstene to the action of oxygen and of treating said 14β-hydroperoxy-17-keto-15-androstene with a mild reducing agent to obtain a 14β-hydroxy-17-keto-15-androstene. A preferred species of the process aspect of this invention is that wherein the oxygenation is carried out in the presence of light and the 17-keto-14-androstene is in solution in an inert solvent, and wherein the mild reducing agent used is triethyl phosphite. When the starting 17-keto-15-androstene is a 5α- or 5β-15-androsten-3β-ol-17-one 3-lower alkanoate, the oxygenation step of our process aspect produces the preferred compounds of the composition aspect of this invention, namely 14β-hydroperoxy-5α-15-androsten-3β-ol-17-one 3-lower alkanoate and 14β-hydroperoxy-5β-15-androsten-3β-ol-17-one 3-lower alkanoate, respectively.

DESCRIPTION OF INVENTION

Product aspect

Included among the 14β-hydroperoxy-17-keto-15-androstenes of my invention are compounds defined by the following structural Formulae I and II and including the 5-dehydro- and the 5α, 6β-dichloro analogs of Formula I wherein R is a member selected from the group consisting of hydrogen and lower alkanoyl and X is a member selected from the group consisting of methyl and formyl.

By "lower alkanoyl" is contemplated acid radicals of hydrocarbon carboxylic acids having up to ten carbon atoms, for example, acid radicals of acetic, propionic, butyric, crotonic, valeric, caproic and capric acids.

In above structural Formula I, and in other structural formulae in this application, the use of a wavy line ($) to designate a bond between a substituent and a carbon on the steroid nucleus indicates the substituent is bonded in either an alpha ($\alpha$) or beta ($\beta$) position with respect to the plane of the steroid nucleus. Additionally, when a compound name does not specify the steric configuration at a given position at which both alpha and beta derivatives are possible, the compound name is to be construed as including both isomeric forms. Thus the compound name 14$\beta$-hydroperoxy-15-androsten-3$\beta$-ol-17-one 3-acetate includes both the 5$\alpha$-hydrogen and the 5$\beta$-hydrogen isomers, i.e. 14$\beta$-hydroperoxy-5$\alpha$-15-androsten-3$\beta$-ol-17-one 3-acetate and 14$\beta$-hydroperoxy-5$\beta$-15-androsten-3$\beta$-ol-17-one 3-acetate.

Compounds defined by Formula I and analogs thereof include the following:

14$\beta$-hydroperoxy-5$\alpha$-15-androsten-3$\beta$-ol-17-one,
14$\beta$-hydroperoxy-5$\beta$-15-androsten-3$\beta$-ol-17-one,
14$\beta$-hydroperoxy-5$\beta$-15-androsten-3$\alpha$-ol-17-one,
14$\beta$-hydroperoxy-5$\alpha$-15-androsten-3$\alpha$-ol-17-one,
14$\beta$-hydroperoxy-5,15-androstadien-3$\beta$-ol-17-one,
14$\beta$-hydroperoxy-5$\alpha$,6$\beta$-dichloro-15-androsten-3$\beta$-ol-17-one and the 3-lower alkanoic acid esters thereof, e.g. the 3-acetate, the 3-propionate, 3-valerate, and 3-caproate esters of each of the foregoing.

Compounds defined by Formula II include: 14$\beta$-hydroperoxy-15-androstene-3$\beta$,5$\beta$-diol-17-one and 14$\beta$-hydroperoxy-15-androstene-3$\beta$,5$\beta$-diol-17-one-19-al 3 - acetate, and 3-lower alkanoic acid esters thereof, e.g. the 3-acetate, 3-propionate and 3-butyrate of each of the foregoing.

The physical embodiment of the compounds of my invention are characterized by being white crystalline solids which are soluble in most polar organic solvents including halogenated hydrocarbons such as chloroform and carbon tetrachloride and nitrogen substituted hydrocarbons such as pyridine and dimethylformamide, and which are insoluble in water and in most non-polar organic solvents including hydrocarbons (e.g. benzene, hexane, and the like) and ethers (e.g. ethyl ether and dioxane).

My compounds are also characterized by the property of being converted to the corresponding 14$\beta$-hydroxy compound upon being subjected to a mild reducing media, e.g. triethyl phosphite in pyridine, according to the process aspect of my invention described fully hereinbelow. These corresponding 14$\beta$-hydroxy derivatives, in turn, are convertible to steroidal cardenolides, according to a sequence of reactions similar to those described in Examples 3 and 6 herein. This sequence of conversions may be illustrated diagrammatically as follows wherein R and X are defined hereinabove for Formulae I and II. When R in Formulae I–IV is lower alkanoyl, R' equals R and only eight steps are required to convert III and IV to the steroidal cardenolides V and VI, respectively. When R in Formulae I–IV is hydrogen, nine steps are required to convert III and IV to V and VI, the first step being esterification at C–3 with a lower alkanoic acid, p-toluene-sulfonic acid and trifluoroacetic anhydride to obtain a compound of Formula III wherein R is lower alkanoyl and is equal to R'.

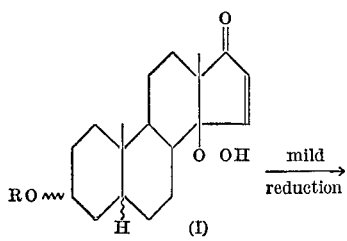

Preferred compounds of my invention are 3-lower alkanoate esters of Formula I having a 3-beta bond, and particularly those wherein R is acetyl, i.e. 14$\beta$-hydroperoxy-5$\alpha$-15-androsten-3$\beta$-ol-17-one 3-acetate and the 5$\beta$-epimer thereof. When subjected to mild reduction they are converted, respectively, to the known 14$\beta$-hydroxy-5$\alpha$-15-androsten - 3$\beta$ - ol - 17 - one 3-acetate and the 5$\beta$-epimer thereof, compounds of Formula III having a 3$\beta$-bond and wherein R is acetyl. When the 5$\alpha$-epimer of my preferred species is subjected to the sequence of reactions described in Example 3, it is converted to a cardenolide of Formula V wherein R is acetate, the bond at C–3 is beta and the bond at C–5 is alpha, i.e. uzarigen acetate (also named 3$\beta$,14$\beta$ - dihydroxy-5$\alpha$-20(22)-cardenolide) which upon acid or alkaline hydrolysis, yield the corresponding 3-hydroxy compound of Formula V, i.e. uzarigenin, a compound known in the art to be useful in the treatment of diarrhea.

Similarly, when the 5β-epimer of the preferred species of the product aspect of this invention, i.e. 14β-hydroperoxy-5β-15-androsten-3β-ol-17-one 3-acetate is subjected to mild reducing conditions there is obtained the corresponding epimer of Formula III, i.e. 14β-hydroxy-5β-15-androsten-3β-ol-17-one 3-acetate which, when subjected to the series of reactions set forth in Example 6, yields a corresponding epimer of Formula V, having a beta bond at C–3 and at C–5, i.e. digitoxigenin acetate (also named chemically as 3β,14β-hydroxy-5β-20(22)-cardenolide) which upon acidic or basic hydrolysis yields the corresponding 3-hydroxy compound, digitoxigenin, a known compound useful as a heart stimulant.

Process aspect

The 14β-hydroperoxy compounds of my invention as exemplified by those defined by Formulae I and II are prepared from 17-keto-14-androstenes by treatment with a source of oxygen preferably in the presence of light according to the oxygenation step of the process aspect of this invention.

The oxygenation is usually effected at room temperature with the 17-keto-14-androstene being in solution in an inert, non-aqueous, organic solvent. Suitable solvents are halogenated hydrocarbons such as chloroform or methylene chloride; nitrogen containing solvents such as pyridine or dimethylformamide; hydrocarbon solvents such as benzene and hexane, or other solvents such as carbon disulfide and alcohols, e.g. ethanol. The source of oxygen may be a stream of oxygen itself, a stream of air, or simply the presence of oxygen alone or oxygen in the air. The peroxidation takes place more rapidly in the presence of light, e.g. sunlight, a fluorescent lamp, an ordinary electric light bulb, or there may advantageously be employed free radical initiators such as benzoyl peroxide, azobisisobutyronitrile, or oxygen carriers such as hemetoporphyrin, or combinations of the foregoing.

The oxygenation reaction may be carried out by bubbling the oxygen source through a solution of the 17-keto-14-androstene while illuminating the reaction vessel with a white light such as from a common fluorescent lamp. The reaction is continued until the starting material disappears as determined by thin layer chromatography, and the resulting 14β-hydroperoxy isolated utilizing known methods such as precipitation, extraction, and chromatographic techniques.

I have found, when preparing the 14β-hydroperoxy-14-androstene-17-ones of Formulae I and II, the oxidation step of my process is conveniently carried out by dissolving the 17-keto-14-androstene in a minimum amount of solvent, e.g. chloroform, and distributing the solution as a thin film on the walls of a flask filled with oxygen, and then allowing the flask to stand at room temperature in the daylight until the disappearance of starting material as evidenced by thin layer chromatography. The resulting 14β-hydroperoxy-17-keto-15-androstene is conveniently isolated by trituration with ether and filtration in yields of over eighty percent theory.

When carrying out my process whereby a 14-androsten-17-one is converted to a 14β-hydroperoxy-15-androsten-17-one and thence to a 14β-hydroxy-15-androstene-17-one, the 14β-hydroperoxy-17-keto-15-androstene prepared and isolated as described above, without further purification, is subjected to mild reductive conditions to obtain the corresponding 14β-hydroxy-17-keto-15-androstene. When an excess of triethyl phosphite in pyridine is employed as reducing agent (usually about 5 moles triethyl phosphite per mole of 14β-hydroperoxy-17-one), theoretical yields of 14β-hydroxy product are obtained. Other reducing agents which may be employed include aluminum amalgam in aqueous tetrahydrofuran, sodium thiosulfate and potassium iodide in acetic acid, zinc and acetic acid, organosulfinic acids and salts thereof such as methyl sulfinic acid and sodium methyl sulfinate and, preferably, trialkyl phosphites, particularly triethylphosphites. When stronger reducing agents, such as metal hydrides, are used, the 17-keto group also reduces to the corresponding 17-hydroxy function which then necessitates re-oxidation of the 17-hydroxy function to a 17-keto to obtain the desired 14β-hydroxy-17-keto-15-androstene.

The reduction of the 14β-hydroperoxy-17-keto-15-androstene to the corresponding 14β-hydroxy derivatives occurs rapidly at moderate temperatures (30–100° C.) in less than a half hour.

In carrying out the physical embodiment of the process aspect of this invention whereby a 14-androsten-17-one is subjected to the action of oxygen and the 14β-hydroperoxy-15-androstene thereby formed is subjected to mild reductive conditions, I have found that, when triethyl phosphite is employed as reducing agent, both steps of my process may be effected concomitantly in a one-vessel, in situ operation. In this mode of carrying out my process, the triethyl phosphite together with the 14-androsten-17-one starting compound (e.g. 5α-14-androsten-3β-ol-17-one 3-acetate) is dissolved in an inert solvent (e.g. chloroform), and the reaction mixture solution is subjected to the action of oxygen; whereby there is isolated 14β-hydroxy-15-androsten-17-one final product. In this mode of my process, the 14β-hydroperoxy-15-androsten-17-one formed by the action of oxygen on the 15-androsten-17-one reacts in situ with the triethyl phosphite present in the solution to produce 14β-hydroxy-15-androsten-17-one. This mode of carrying out my process thus advantageously eliminates the step of isolating the 14β-hydroperoxy-15-androstene intermediate.

Some 17-keto-14-androstene starting compounds of my process are known, e.g. 5α-14-androsten-3β-ol-17-one 3-acetate. When not available, the 17-keto-14-androstenes, e.g. 5α,6β-dichloro-14-androsten-3β-ol-17-one, are conveniently prepared from the corresponding D-ring saturated 17-keto androstane, e.g. 5α,6β-dichloro-androstan-3β-ol-17-one 3-acetate by enol acetylation thereof via known techniques, e.g. with p-toluenesulfonic acid and isopropenyl acetate, followed by bromination at C–16 and dehydrobromination of the 16α-bromo-17-keto-androstane thereby formed (e.g. 5α,6β-dichloro-16α-bromo-androstan-3β-ol-17-one 3-acetate) for example with lithium bromide and lithium carbonate in dimethylformamide, to obtain the corresponding 17-keto-14-androstene, e.g. 5α,6β-dichloro-14-androsten-3β-ol-17-one 3-acetate.

The following examples exemplify the process and product aspects of my invention. They are not to be construed as limiting the scope of the invention which is defined by the claims attached hereto.

PREPARATION OF STARTING COMPOUNDS

Preparation A

5α-14-androsten-3β-ol-17-one 17-acetate.—To a solution of 10 g. of 5-α-androstan-3β-ol-17-one 17-acetate in 200 ml. of isopropenyl acetate add 500 mg. of p-toluenesulfonic acid, and slowly distill the reaction mixture for 5 hours until 100 ml. of distillate has been collected. Add an additional 100 ml. of isopropenyl acetate to the reaction mixture and reflux for 60 hours. Cool the solution, wash with dilute aqueous sodium bicarbonate followed by water then dry over sodium sulfate and evaporate to a residue comprising the enol acetate, i.e. 5α-16-androstene-3β,17β-diol diacetate. Purify by crystallization from ether to yield 10.67 g., M.P. 172° C.

Dissolve the enol acetate in 400 ml. of carbon tetrachloride then add a solution of 4.6 g. of bromine in 50 ml. of carbon tetrachloride. Evaporate the reaction mixture to a residue comprising 16α-bromo-5α-androstan-3β-ol-17-one 3-acetate. Purify by crystallization from ether-hexane. Yield=10.8 g., M.P. 173° C.

Dissolve the 16α-bromo derivative prepared above in 100 ml. of dimethylformamide, add 10 g. of lithium bromide and 10 g. of lithium carbonate and stir under an argon atmosphere at 180° C. for 3 hours. Cool the reaction mixture to room temperature, dilute with ice water then acidify with dilute hydrochloric acid and extract with ethyl acetate. Wash the combined organic extracts with water then dry over sodium sulfate and evaporate in vacuo to a residue comprising 5α-14-androsten-3β-ol-17-one 3-acetate. Purify by crystallization from ether-hexane, M.P. 152–155° C.

$[\alpha]+110°$ $\lambda_{max.}^{Nujol}$ 5.78µ

PREPARATION B

5β-14-androsten-3β-ol-17-one 3-acetate
5β-14-androsten-3α-ol-17-one 3-acetate
5α-14-androsten-3α-ol-17-one 3-acetate
5α,6β-dichloro-14-androsten-3β-ol-17-one 3-acetate In a manner siimlar to that described in Preparation A, treat each of 5β-androsten-3β-ol-17-one 3-acetate, 5β-androstan-3α-ol-17-one 3-acetate, 5α-androstan-3α-ol-17-one 3-acetate and 5α,6β-dichloro-androstan-3β-ol-17-one 3-acetate with isopropenyl acetate in p-toluensulfonic acid and treat each of the respective enol acetates thereby formed with bromine in carbon tetrachloride to obtain respectively, 16α-bromo-5β-androstan-3β-ol-17-one 3-acetate, 16α-bromo-5β-androstan-3α-ol-17-one 3-acetate, 16α-bromo-5α-androstan-3α-ol-17-one 3-acetate and 5α,6β-dichloro - 16α - methyl-14-androsten-3β-ol-17-one 3-acetate. Treat each of the foregoing 16α-bromo derivatives with lithium bromide and lithium carbonate in dimethyl formamide and isolate and purify the resultant respective compounds in a manner similar to that described to obtain respectively 5β-14-androsten-3β-ol-17-one 3-acetate, 5β-14-androsten-3α-ol-17-one 3-acetate, 5α-14-androsten-3α-ol-17-one 3-acetate and 5α,6β-dichloro-14-androsten-3β-ol-17-one 3-acetate.

PREPARATION C 5,14-androstadien-3β-ol-17-one 3-acetate.—To a solution of 1 g. of 5α,6β-dichloro-14-androsten-3β-ol-17-one 3-acetate in 50 ml. of benzene and 50 ml. of acetic acid add with stirring at room temperature over a 2 hour period 25 g. of zinc dust in four portions. Filter the reaction mixture and evaporate the filtrate to a residue comprising 5,14-androstadien-3β-ol-17-one 3-acetate. Purify by dissolving the residue in chloroform and washing the chloroform solution with water then drying over sodium sulfate and evaporating to a residue comprising 5,14-androstadien-3β-ol-17-one 3-acetate.

PREPARATION D

14 - androstene-3β,5β-diol-17-one-19-al 3-acetate.—The requisite intermediate, i.e. androstane-3β,5β-diol-17-one-19-al, is prepared from the known compound androstane-3β,5β,19-triol-17-one by oxidation with chromic acid in acetic acid in known manner. Isolation and purification of the compound is effective via chromatographic techniques.

In a manner similar to that described in Preparation A, treat androstane-3β,5β-diol-17-one-19-al with isopropenyl acetate in p-toluenesulfonic acid to obtain the enol acetate, 16-androstene-3β,5β-17-triol-19-al 3,17-acetate. Brominate the enol acetate with bromine in carbon tetrachloride and then treat the 16α-bromo-androstane-3β,5β-diol-17-one-19-al 3-acetate thereby formed with lithium bromide and lithium carbonate in dimethylformamide and isolate and purify the resultant compound in a manner similar to that described in Preparation A to obtain 14-androstene-3β,5β-diol-17-one-19-al 3-acetate.

PREPARATION E 14-androstene-3β,5β-diol-17-one 3-acetate.—The requisite starting compound, i.e. androstane-3β,5β-diol-17-one 3-acetate is prepared as follows:

Add N-bromoacetamide (1.5 g.) during 30 minutes to a solution of androstenolone acetate, I (3.3 g.), in dioxane (30 ml.) and 0.28 M perchloric acid (1.8 ml.). After stirring for 30 minutes, cool the mixture to 10° C. and dilute with 50 ml. ice water. Extract the mixture with ether, wash with 10% sodium thiosulfate, water, dry over sodium sulfate and evaporate. Dissolve the resulting residue in methanol (50 ml.) containing potassium hydroxide (0.56 g.), and heat on a steambath for 30 minutes. Dilute the mixture with water and extract with chloroform. Dry the extract over sodium sulfate and evaporate to a residue comprising 5β,6β-oxido-androstane-3β-ol-17-one 3-acetate. Dissolve this 5β,6β-oxido derivative in dry tetrahydrofuran (60 ml.) and to this add a solution of lithium aluminumhydride (2.8 g.) in dry tetrahydrofuran. After 3 hours add ethyl acetate (1 ml.) to the mixture then dilute with water, acidify with dilute hydrochloric acid and extract with chloroform. Dry the extract with sodium sulfate and evaporate. Chromatograph the residue over silica gel (150 g.) and elute with chloroform. Evaporate the combined chloroform eluates to a residue comprising androstane-3β,5β,17β-triol.

To androstane-3β,5β,17β-triol (616 mg.) in t-butanol (25 ml.) slowly add N-bromoacetamide (276 mg.) in water (2 ml.). After 3 hours at room temperature, dilute the mixture with water, extract with chloroform and wash the combined extracts with 10% aqueous sodium thiosulfate, then water. Evaporate to a residue comprising androstane-3β,5β-diol-17-one.

In a manner similar to that described in Preparation A, treat androstane-3β,5β-diol-17-one with isopropenyl acetate in p-toluenesulfonic acid and then treat the enol acetate thereby formed, i.e. 16-androstene-3β,5β,17-triol 3,17-diacetate with bromine in carbon tetrachloride to obtain 16α-bromo-androstene-3β,5β-diol-17-one 3-acetate. Treat the 16α-bromo derivative with lithium bromide and lithium carbonate in dimethylformamide and isolate and purify the resultant product thereby formed in a manner similar to that described in Preparation A to obtain 14-androstene-3β,5β-diol-17-one 3-acetate.

Preparation F.—3-hydroxy-14-androstenes-17-ones (1) 5α-14-androsten-3β-ol-17-one.—To 3.3 g. of 5α-14-androsten-3β-ol-17-one 3-acetate in 150 ml. of methanol, add a solution of 0.56 g. of potassium hydroxide in 50 ml. of methanol and allow the solution to stand at room temperature for one hour. Concentrate the solution in vacuo to a small volume, add water, acidify with hydrochloric acid and extract with chloroform. Wash the combined chloroform extracts with water, dry over sodium sulfate and evaporate to a residue comprising 5α-14-androsten-3β-ol-17-one.

(2) Treat each of the following 3β-acetoxy-14-androsten-17-ones with potassium hydroxide in methanol in the manner described in above Preparation F (1):

5β-14-androsten-3β-ol-17-one 3-acetate,
5β-14-androsten-3α-ol-17-one 3-acetate,
5α-14-androsten-3α-ol-17-one 3-acetate,
5,14-androstadien-3β-ol-17-one 3-acetate,
14-androstene-3β,5β-diol-17-one-19-al 3-acetate,
14-androstene-3β,5β-diol-17-one 3-acetate.

Isolate and purify the resultant respective products in a manner similar to that described in Preparation F (1) to obtain respectively 5β-14-androsten-3β-ol-17-one,
5β-14-androsten-3α-ol-17-one,
5α-14-androsten-3α-ol-17-one,
5,14-androstadien-3β-ol-17-one,
14-androstene-3β,5β-diol-17-one-19-al,
14-androstene-3β,5β-diol-17-one.

EXAMPLE 1

14β-hydroperoxy-5α-15-androsten-3β-ol-17-one 3-acetate

Dissolve 1 g. of 5α-14-androsten-3β-ol-17-one 3-acetate in the minimum amount of chloroform (about 5 ml.) and distribute this solution as a thin film on the walls of a 5 l. conical flask. Fill the flask with oxygen, then seal the flask and allow it to stand at room temperature for five days or until thin layer chromatography shows complete disappearance of the starting compound. Triturate the oxygenated reaction mixture with ether and filter the resultant precipitate comprising 14β-hydroperoxy-5α-15-androsten-3β-ol-17-one 3-acetate. (Yield=502 mg.)

Isolate additional product from the filtrate by thick layer chromatography utilizing a 20 x 20 x 0.1 cm., silica gel preparative layer plate and utilizing as development solvent 10% ethyl acetate in chloroform. The band corresponding to the band of the crystallized 14β-hydroperoxy-5α-15-androsten-3β-ol-17-one 3-acetate obtained hereinabove was isolated and crystallized from ether to yield an additional 393 mg. of 14β-hydroperoxy-5α-15-androsten-3β-ol-17-one 3-acetate. The total yield of product is therefore 0.895 g. (82% theory).

Purify by recrystallization from ether acetate/ether to obtain 14β-hydroperoxy-5α-15-androsten-3β-ol-17-one 3-acetate M.P. 175–180° (dec.), $\lambda_{max.}^{MeOH}$ 212 mμ (8800), $[\alpha]_D$+43.2 (c. 0.3 dioxane)

Positive starch iodide test.

In similar manner by utilizing other 3-lower alkanoate esters instead of the 3-acetate esters of 5α-15-androsten-3β-ol-17-one in the above reaction, e.g. the 3-propionate, 3-valerate, 3-caproate or 3-caprylate, there is obtained the corresponding 3-lower alkanoate ester of 14β-hydroperoxy-5α-15-androsten-3β-ol-17-one 3-acetate, e.g. the 3-propionate, 3-valerate, 3-caproate, or 3-caprylate, respectively of 14β-hydroperoxy-5α-15-androsten-3β-ol-17-one.

The oxidation of this example may also be carried out by bubbling oxygen into a solution of 5α-14-androsten-3β-ol-17-one 3-acetate in a solvent such as chloroform, or methylene chloride or in solvent mixtures, e.g. ethanol/pyridine/triethylamine with or without the presence of cupric salts. The resultant product is isolated by precipitation or via chromatographic techniques known in the art.

EXAMPLE 2

5α-15-androstene-3β,14β-diol-17-one 3-acetate

To a solution of 0.1 g. of 14β-hydroperoxy-5α-15-androsten-3β-ol-17-one 3-acetate in 1 ml. of pyridine add 0.5 ml. of triethylphosphite. Heat the reaction mixture on a steam bath for about 15 min. then evaporate under an air draft at room temperature to a residue comprising 5α-15-androstene-3β,14β-diol-17-one 3-acetate.

Purify by crystallization from acetone/hexane to give 5α - 15 - androstene - 3β,14β - diol - 17 - one 3 - acetate. Yield=0.085 g. (theoretical yield) M.P. 162–163°, $[\alpha]_D$+104.2° (c. 0.3, dioxane), $\lambda_{max}$, 212 mμ (ε 8000).

In similar manner by treating each of the 3-propionate, 3-valerate, 3-caproate and 3-caprylate esters of 14β-hydroperoxy-5α-15-androsten-3β-ol-17-one with triethylphosphite in pyridine in the above described manner and isolating and purifying the resultant product in a manner similar to that described above, there are obtained the 3-propionate, 3-valerate, 3-caproate and 3-caprylate esters, respectively, of 5α-15-androstene-3β,14β-diol-17-one.

EXAMPLE 3

Conversion of 5α-15-androstene-3β,14β-diol-17-one 3-acetate to uzarigenin

5α-15-androstene-3β,14β-diol-17-one 3-acetate prepared as described hereinabove is converted to uzarigenin utilizing procedures known in the art as follows:

Hydrogenate 5α-15-androstene-3β,14β-diol-17-one 3-acetate in ethyl acetate in the presence of 5% pre-reduced palladium charcoal catalyst at room temperature and pressure with an equimolar quantity of hydrogen to obtain androstane-3β,14β-diol-17-one 3-acetate. Alternatively, this androstanediol is obtained from 5,15-androstadiene-3β,14β-diol-17-one 3-acetate (prepared as in Example 5) by hydrogenation thereof in the foregoing manner with two moles of hydrogen per mole of steroid to obtain 5α-15-androstene-3β,14β-diol-17-one 3-acetate.

Treat 5α-15-androstane-3β,14β-diol-17-one 3-acetate in dimethylsulfoxide with ethylidenetriphenylphosphorane to obtain 5α-17(20)-pregnene-3β,14β-diol 3-acetate.

Treat 5α-17(20)-pregnene-3β,14β-diol 3-acetate with diborane-tetrahydrofuran complex in tetrahydrofuran followed by treatment in situ of the product thereby formed with alkaline hydrogen peroxide (e.g. 30% hydrogen peroxide in 10% sodium hydroxide solution) to obtain 5α-pregnane-3β,14β,20-triol.

Selectively reacetylate 5α-pregnane-3β,14β,20-triol with one mole of acetic anhydride in pyridine to obtain 5α-pregnane-3β,14β,20-triol 3-acetate. Oxidize 5α-pregnane-3β,14β,20-triol 3-acetate by standard procedures (e.g. chromic oxide in acetic acid) to obtain 5α-pregnane-3β,14β-diol-20-one 3-acetate.

Treat 5α-pregnane-3β,14β-diol-20-one 3-acetate with lithium ethoxyacetylide in tetrahydrofuran under nitrogen to obtain 5α-pregnane-3β,14β-diol-20-ethoxyacetylide. Treat the foregoing with 2% sulfuric acid in aqueous methanol at room temperature to effect rearrangement of the 20-ethoxyacetylide group to a 20-methylidenecarboxyethylate group, then reacetylate at C–3 with acetic anhydride in pyridine and chromatograph on silica gel to give 5α-pregnane-3β,14β-diol-20-methylidene - carboxyethylate 3-acetate.

Oxidize 5α-pregnane - 3β,14β-diol-20-methylidene-carboxyethylate 3-acetate with selenium dioxide in benzene at reflux temperature to obtain uzarigenin 3-acetate. Hydrolyze by adsorption on alkaline alumina to obtain uzarigenin.

EXAMPLE 4

14β-hydroperoxy-5β-15-androsten-3β-ol-17-one 3-acetate

14β-hydroperoxy-5β-15-androsten-3α-ol-17-one 3-acetate

14β-hydroperoxy-5α-15-androsten-3α-ol-17-one 3-acetate

5α,6β-dichloro-14β-hydroperoxy-15-androsten-3β-ol-17-one 3-acetate

14β-hydroperoxy-5,14-androstadien-3β-ol-17-one 3-acetate

In a manner similar to that described in Example 1 treat a thin film of each of the following with oxygen:

5β-14-androsten-3β-ol-17-one 3-acetate,
5β-14-androsten-3α-ol-17-one 3-acetate,
5α-14-androsten-3α-ol-17-one 3-acetate,
5α,6β-dichloro-14-androsten-3β-ol-17-one 3-acetate, and
5,14-androstadien-3β-ol-17-one 3-acetate.

Isolate and purify each of the resultant compounds in a manner similar to that described to obtain, respectively, 14β-hydroperoxy-5β-15-androsten-3β-ol-17-one 3-acetate,
14β-hydroperoxy-5β-15-androsten-3α-ol-17-one 3-acetate,
14β-hydroperoxy-5α-15-androsten-3α-ol-17-one 3-acetate,
5α,6β-dichloro-14β-hydroperoxy-15-androsten-3β-ol-17-one 3-acetate, and
14β-hydroperoxy-5,14-androstadien-3β-ol-17-one 3-acetate.

EXAMPLE 5

14β-hydroxy-5β-15-androsten-3β-ol-17-one 3-acetate

14β-hydroxy-5β-15-androsten-3α-ol-17-one 3-acetate

14β-hydroxy-5α-15-androsten-3α-ol-17-one 3-acetate

5α,6β-dichloro-14β-hydroxy-15-androsten-3β-ol-17-one 3-acetate

14β-hydroxy-5,15-androstadien-3β-ol-17-one 3-acetate

In a manner similar to that described in Example 2 treat each of the following compounds with triethyl phosphite in pyridine.

14β-hydroperoxy-5β-15-androsten-3β-ol-17-one 3-acetate,
14β-hydroperoxy-5β-15-androsten-3α-ol-17-one 3-acetate,
14β-hydroperoxy-5α-15-androsten-3α-ol-17-one 3-acetate,
5α,6β-dichloro-14β-hydroperoxy-15-androsten-3β-ol-17-one 3-acetate,
14β-hydroperoxy-5,14-androstadien-3β-ol-17-one 3-acetate.

Isolate and purify each of the resultant products in a manner similar to that described in Example 2 to obtain respectively, 14β-hydroxy-5β-15-androsten-3β-ol-17-one 3-acetate,
14β-hydroxy-5β-15-androsten-3α-ol-17-one 3-acetate,
14β-hydroxy-5α-15-androsten-3β-ol-17-one 3-acetate,
5α,6β-dichloro-14β-hydroxy-15-androsten-3β-ol-17-one 3-acetate, and
14β-hydroxy-5,15-androstadien-3β-ol-17-one 3-acetate.

EXAMPLE 6

Conversion of 5β,15-androstene-3β,14β-diol-17-one 3-acetate to digitoxigenin

5β,15-androstene-3β,14β-diol-17-one 3-acetate prepared as described hereinabove is converted to digitoxigenin utilizing procedures known in the art as follows.

Hydrogenate 5β-15-androstene-3β,14β-diol-17-one 3-acetate in ethyl acetate in the presence of 5% pre-reduced palladium charcoal catalyst at room temperature and pressure with an equimolar quantity of hydrogen to obtain 5β-androstane-3β,14β-diol-17-one 3-acetate.

Treat 5β-androstane-3β,14β-diol-17-one 3-acetate in dimethylsulfoxide with ethylidenetriphenylphosphorane to obtain 5β-17(20)-pregnene-3β,14β-diol 3-acetate.

Treat 5β-17(20)-pregnene-3β,14β-diol 3-acetate with diborane-tetrahydrofuran complex in tetrahydrofuran followed by treatment in situ of the product thereby formed with alkaline hydrogen peroxide (e.g. 30% hydrogen peroxide in 10% aqueous sodium hydroxide) to obtain 5β-pregnane-3β,14β,20-triol.

Selectively reacetylate 5β-pregnane-3β,14β,20-triol 3-acetate thereby formed by standard procedures (e.g. chromic oxide in acetic acid) to obtain 5β-pregnane-3β,14β-diol-20-one 3-acetate.

Treat the 5β-pregnane-3β,14β-diol-20-one 3-acetate with lithium ethoxyacetylide in tetrahydrofuran under nitrogen to obtain 5β-pregnane-3β,14β-diol - 20 - ethoxyacetylide. Treat the foregoing with 2% sulfuric acid in aqueous methanol at room temperature to effect rearrangement of the 20-ethoxyacetylide group to a 20-methylidenecarboxyethylate group.

Reacetylate at C-3 with acetic anhydride in pyridine and chromatograph on silica gel to obtain 5β-pregnane-3β,14β-diol-20-methylidenecarboxyethylate 3-acetate.

Oxidize 5β-pregnane-3β,14β-diol - 20 - methylidenecarboxyethylate 3-acetate with selenium dioxide in benzene at reflux temperature to obtain digitoxigenin 3-acetate. Hydrolyze by adsorption on alkala alumina to obtain digitoxigenin.

EXAMPLE 7

15-androstene-3β,5β,14β-triol-17-one 3-acetate

In a manner similar to that described in Example 1, treat a thin film of 14-androstene-3β,5β-diol-17-one 3-acetate in chloroform with oxygen. Isolate and purify the resultant product in the manner described to obtain 14β-hydroperoxy-15-androstene-3β,5β-diol-17-one 3-acetate.

In a manner similar to that described in Example 2 treat 14β-hydroperoxy-15-androstene-3β,5β-diol-17-one 3-acetate in pyridine with triethyl phosphite. Isolate and purify the resultant product in a manner similar to that described in Example 2 to obtain 15-androstene-3β,5β,14β-triol-17-one 3-acetate.

The compound of this example (i.e. 15-androstene-3β,5β,14β-triol-17-one 3-acetate) is converted to the cardenolide periplogenin via a sequence of reactions similar to those described in Example 6.

EXAMPLE 8

15-androstene-3β,5β,14β-triol-17-one-19-al 3-acetate

In a manner similar to that described in Example 1, subject a thin film of 14-androstene-3β,5β-diol-17-one-19-al 3-acetate in chloroform to oxygen and isolate and purify the resultant product in a manner described to obtain 14β-hydroperoxy-15-androstene-3β,5β-diol-17-one-19-al 3-acetate.

In a manner similar to that described in Example 2 treat 14β-hydroperoxy-15-androstene-3β,5β-diol-17-one-19-al 3-acetate in pyridine with triethyl phosphite. Isolate and purify the resultant product in a manner similar to that described to obtain 15-androstene-3β,5β,14β-triol-17-one-19-al 3-acetate.

The compound of this example is converted to the cardenolide strophanthidin via a series of reactions similar to those described in Example 6.

EXAMPLE 9

Preparation of 3β-15-androstene-3,14β-diol-17-one 3-alkanoates via the 3β-hydroxy-14β-hydroperoxy-15-androsten-17-one intermediates (A) 14β-hydroperoxy-5α-15-androsten-3β-ol-17-one.—In a manner similar to that described in Example 1 treat a thin film of 5α-14-androsten-3β-ol-17-one in chloroform to the action of oxygen and isolate and purify the resultant product in a manner similar to that described to obtain 14β-hydroperoxy-5α-15-androsten-3β-ol-17-one.

In similar manner treat a chloroform film of each of the following with oxygen:

5β-14-androsten-3β-ol-17-one,
5β-14-androsten-3α-ol-17-one,
5α-14-androsten-3α-ol-17-one,
5,14-androstadien-3β-ol-17-one,
14-androstene-3β,5β-diol-17-one-19-al,
14-androstene-3β,5β-diol-17-one.

Isolate and purify the resultant products in a manner similar to that described above to obtain respectively, 14β-hydroperoxy-5β-15-androsten-3β-ol-17-one,
14β-hydroperoxy-5β-15-androsten-3α-ol-17-one,
14β-hydroperoxy-5α-15-androsten-3α-ol-17-one,
14β-hydroperoxy-5,15-androstadien-3β-ol-17-one,
14β-hydroperoxy-15-androstene-3β,5β-diol-17-one-19-al,
14β-hydroperoxy-15-androstene-3β,5β-diol-17-one.

(B) 14β-hydroxy-5α-15-androsten-3β-ol-17-one.—Treat 14β-hydroperoxy - 5α - 15 - androsten-3β-ol-17-one with triethyl phosphite in pyridine in a manner similar to that described in Example 2. Isolate and purify the resultant product in a manner similar to that described to obtain 5α-15-androstene-3β,14β-diol-17-one.

In a similar manner treat each of the 14β-hydroperoxy-15-androstenes prepared as described in the second paragraph of Example 9(A) and isolate and purify the resultant products in a manner similar to that described in the first paragraph of this example to obtain respectively:

14β-hydroxy-5β-15-androsten-3β-ol-17-one,
14β-hydroxy-5β-15-androsten-3α-ol-17-one,
14β-hydroxy-5α-15-androsten-3α-ol-17-one,
14β-hydroxy-5,15-androstadien-3β-ol-17-one,
14β-hydroxy-15-androstene-3β,5β-diol-17-one-19-al,
14β-hydroxy-15-androstene-3β,5β-diol-17-one.

(C) 14β-hydroxy-5α-15-androsten-3β-ol-17-one 3-acetate.—Dissolve 1 g. of 5α-15-androstene-3β,14β-diol-17-one in 10 g. of acetic acid and add 5 ml. of trifluoroacetic anhydride and 0.1 g. of p-toluenesulfonic acid. Allow the solution to stand at room temperature for 15 minutes, then pour into ice water and extract with ethyl acetate. Wash the ethyl acetate extracts with water and distill in vacuo to a residue comprising 5α-15-androstene-3β,14β-diol-17-one 3-acetate.

In similar manner treat each of the 15-androstene-3β,14β-diol-17-ones prepared in the second paragraph of Example 9(B) with acetic acid, trifluoroacetic anhydride and p-toluenesulfonic acid and isolate and purify the resultant products as described hereinabove to obtain, respectively, 14β-hydroxy-5β-15-androsten-3β-ol-17-one 3-acetate,
14β-hydroxy-5β-15-androsten-3α-ol-17-one 3-acetate,
14β-hydroxy-5α-15-androsten-3α-ol-17-one 3-acetate,
14β-hydroxy-5,15-androstadien-3β-ol-17-one 3-acetate,
14β-hydroxy-15-androstene-3β,5β-diol-17-one-19-al 3-acetate,
14β-hydroxy-15-androstene-3β,5β-diol-17-one 3-acetate.

In the above esterification procedure, by substituting other lower alkanoic acids, e.g. propionic, valeric, and caproic acid for acetic acid there is obtained the corresponding 3-lower alkanoate ester, the 3-propionate, 3-valerate and 3-caproate respectively of each of the above compounds.

EXAMPLE 10

5α-15-androstene-3β,14β-diol-17-one 3-acetate from 5α-14-androsten-3β-ol-17-one 3-acetate Dissolve 1 g. of 5α-14-androsten-3β-ol-17-one 3-acetate in a mixture of 2.5 ml. of chloroform and 2.5 ml. of triethyl phosphite and distribute this solution as a thin film on the walls of a 5 l. conical flask. Fill the flask with oxygen, then seal the flask and allow it to stand at room temperature for five days or until thin layer chromatography shows complete disappearance of the starting compound. Triturate the oxygenated reaction mixture with ether and filter the resultant precipitate comprising 14β-hydroxy-5α-15-androsten-3β-ol-17-one 3-acetate. Purify in a manner similar to that described in Example 2.

Similarly, treat a chloroform solution of triethyl phosphite together with each of the following 14-androsten-17-ones with oxygen in the manner described in the foregoing paragraph:
5β-14-androsten-3β-ol-17-one,
5β-14-androsten-3α-ol-17-one,
5α-14-androsten-3α-ol-17-one,
5,14-androstadien-3β-ol-17-one,
14-androstene-3β,5β-diol-17-one-19-al,
14-androstene-3β,5β-diol-17-one,
5β,14-androsten-3β-ol-17-one 3-acetate,
5β-14-androsten-3α-ol-17-one 3-acetate,
5α-14-androsten-3α-ol-17-one 3-acetate,
5,14-androstadien-3β-ol-17-one 3-acetate,
14-androstene-3β,5β-diol-17-one-19-al 3-acetate,
14-androstene-3β,5β-diol-17-one 3-acetate.

Isolate the resultant respective products in a manner similar to that described hereinabove to obtain respectively:
5β-15-androstene-3β,14β-diol-17-one,
5β-15-androstene-3α,14β-diol-17-one,
5α-15-androstene-3α,14β-diol-17-one,
5,15-androstadiene-3β,14β-diol-17-one,
15-androstene-3β,5β,14β-triol-17-one-19-al,
15-androstene-3β,5β,14β-triol-17-one,
5β-15-androstene-3β,14β-diol-17-one 3-acetate,
5β-15-androstene-3α,14β-diol-17-one 3-acetate,
5α-15-androstene-3α,14β-diol-17-one 3-acetate,
5,15-androstadiene-3β,14β-diol-17-one 3-acetate,
15-androstene-3β,5β,14β-triol-17-one-19-al 3-acetate,
15-androstene-3β,5β,14β-triol-17-one 3-acetate.

I claim:
1. A compound selected from the group consisting of 14β-hydroperoxy-15-androsten-17-ones of the following structural Formulae I and II, and the 5-dehydro- and the 5α,6β-dichloro analogs of Formula I:

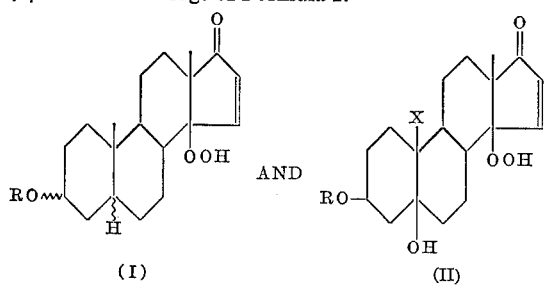

wherein R is a member selected from the group consisting of hydrogen and lower alkanoyl and X is a member selected from the group consisting of methyl and formyl.

2. A compound according to claim 1 of Formula I wherein R is acetyl said compound being a member selected from the group consisting of 14β-hydroperoxy-5α-15-androsten-3α-ol-17-one 3-acetate,
14β-hydroperoxy-5α-15-androsten-3β-ol-17-one 3-acetate,
14β-hydroperoxy-5β-15-androsten-3β-ol-17-one 3-acetate, and
14β-hydroperoxy-5β-15-androsten-3α-ol-17-one 3-acetate.

3. A compound according to claim 1 of Formula I wherein R is acetyl, the 3-OR group is in the beta position, and the 5-hydrogen is in the alpha position, said compound being 14β-hydroperoxy-5α-15-androsten-3β-ol-17-one 3-acetate.

4. A compound according to claim 1 of Formula I wherein R is acetyl and both the 3-OR and the 5-hydrogen are in the beta position, said compound being 14β-hydroperoxy-5β-15-androsten-3β-ol-17-one 3-acetate.

5. A process for the preparation of a 14β-hydroxy-17-keto-15-androstene selected from the group consisting of compounds of Formulae I and II and the 5-dehydro and 5α-6β-dichloro analogs of compounds of Formula I:

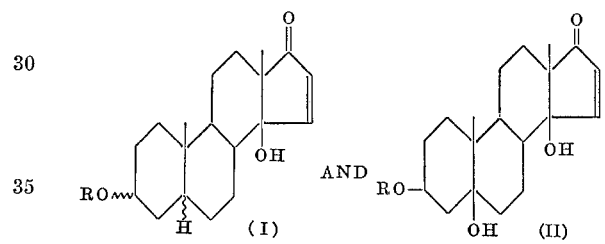

wherein R is a member selected from the group consisting of hydrogen and lower alkanoyl and X is a member selected from the group consisting of methyl and formyl; which comprises subjecting to the action of oxygen a member selected from the group consisting of a 17-keto-14-androstene of following Formulae A and B and the 5-dehydro and the 5α,6β-dichloro analogs of Formula A:

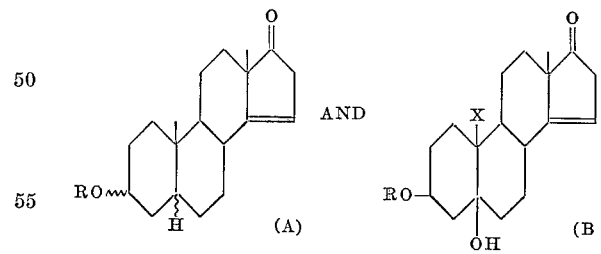

wherein R and X are as hereinabove defined, and treating the thereby formed 14β-hydroperoxy-17-keto-15-androstene of the following Formulae C and D and the 5-dehydro and 5α,6β-dichloro analogs of compounds of Formula C:

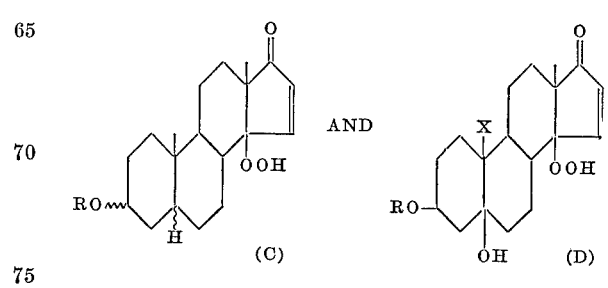

wherein R and X are as hereinabove defined, with a mild reducing agent.

6. A process according to claim 5 wherein said 17-keto-14-androstene is in the presence of light when subjected to the action of oxygen and wherein said mild reducing agent is triethyl phosphite.

7. A process according to claim 6 when carried out in an inert solvent.

8. A process according to claim 6 wherein said 17-keto-14-androstene is in chloroform when subjected to the action of oxygen in the presence of light and wherein said mild reducing agent is triethyl phosphite in pyridine.

9. A process according to claim 6 wherein said 17-keto-14-androstene is 5α-14-androsten-3β-ol-17-one 3-acetate which is in chloroform when subjected to the action of oxygen in the presence of light, and wherein said mild reducing agent is triethyl phosphite; said process comprising subjecting 5α-14-androsten-3β-ol-17-one 3-acetate in chloroform to the action of oxygen in the presence of light and treating the therebyl formed 14β-hydroperoxy-5α-15-androsten-3β-ol-17-one 3-acetate with triethyl phosphite whereby is formed 14β-hydroxy-5α-15-androsten-3β-ol-17-one 3-acetate.

10. A process according to claim 6 wherein said 17-keto-14-androstene is 5β-14-androsten-3β-ol-17-one 3-acetate which is in chloroform when subjected to the action of oxygen in the presence of light, and wherein said mild reducing agent is triethyl phosphite, said process comprising subjecting 5β-14-androsten-3β-ol-17-one 3-acetate in chloroform to the action of oxygen in the presence of light and treating the thereby formed 14β-hydroperoxy-5β-15-androsten-3β-ol-17-one 3-acetate with triethyl phosphite whereby is formed 14β-hydroxy-5β-15-androsten-3β-ol-17-one 3-acetate.

11. A process according to claim 6 wherein said 17-keto-14-androstene selected from the group consisting of compounds of Formulae A and B and the 5-dehydro and the 5α,6β-dichloro analogs of Formula A is in an inert solvent containing said triethyl phosphite when subjected to the action of oxygen in the presence of light, whereby is formed a 14β-hydroxy-15-androstene selected from the group consisting of compounds of Formulae I and II and the 5-dehydro and 5α,6β-dichloro analogs of compounds of Formula I.

12. A process according to claim 11 wherein said inert solvent is chloroform.

13. The process for the preparation of a 14β-hydroperoxy-17-keto-15-androstene selected from the group consisting of compounds of Formulae I and II and the 5-dehydro and 5α,6β-dichloro analogs of compounds of Formula I:

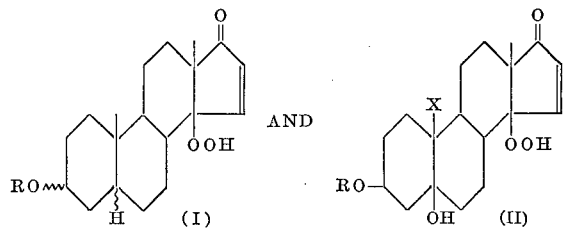

wherein R is a member selected from the group consisting of hydrogen and lower alkanoyl, and X is a member selected from the group consisting of methyl and formyl; which comprises subjecting to the action of oxygen a 17-keto-14-androstene selected from the group consisting of compounds of Formulae A and B and the 5-dehydro and the 5α,6β-dichloro analogs of Formula A:

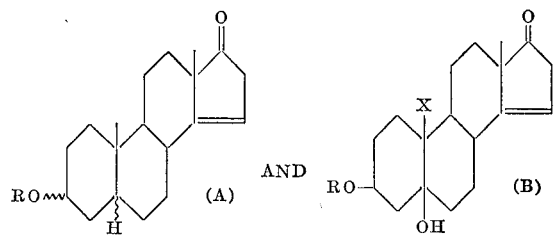

wherein R and X are as hereinabove defined.

14. The process according to claim 13 when carried out in an inert solvent and in the presence of light.

15. The process of claim 14 wherein said inert solvent is chloroform.

16. The process of claim 14 wherein said inert solvent is chloroform and said 17-keto-14-androstene is 5α-14-androsten-3β-ol-17-one 3-acetate whereby is prepared 14α-hydroperoxy-5β-15-androsten-3β-ol-17-one 3-acetate.

17. The process of claim 14 wherein said inert solvent is chloroform and said 17-keto-14-androstene is 5β-14-androsten-3β-ol-17-one 3-acetate whereby is prepared 14β-hydroperoxy-5β-15-androsten-3β-ol-17-one 3-acetate.

References Cited

Djerassi: Steroid Reactions, pp. 365–66 (1963).

Hudson: Structure & Mechanism in Organo-Phosphorus Chemistry, p. 171, Academic Press (1965).

Kirk et al.: Steroid Reaction Mechanisms, pp. 432–35, Elsevier Pub. Co., N.Y. (1968).

HENRY A. FRENCH, Primary Examiner

U.S. Cl. X.R.

260—239.57, 397.4, 999

UNITED STATES PATENT OFFICE
CERTIFICATE OF CORRECTION

Patent No. 3,595,883    Dated July 27, 1971

Inventor(s) Adriano Afonso

It is certified that error appears in the above-identified patent and that said Letters Patent are hereby corrected as shown below:

Column 4, lines 1-10, that portion of formula III reading

" 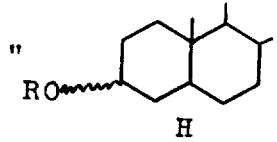 " should read --- 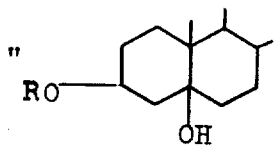 ---.

Column 7, line 57, "3,17-acetate" should read ---3,17-diacetate---.

Column 14, lines 27-38 (claim 5), that portion of formula II reading

" 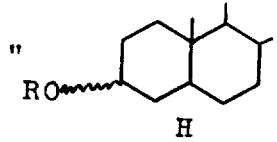 " should read --- 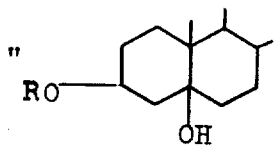 ---.

Column 15, line 21 (claim 9), "therebyl" should read ---thereby---.

Signed and sealed this 28th day of December 1971.

(SEAL)
Attest:

EDWARD M. FLETCHER, JR.
Attesting Officer

ROBERT GOTTSCHALK
Acting Commissioner of Patents